Nov. 18, 1969   V. H. SIEGEL   3,478,605
ACCELEROMETER AND PICKOFF SYSTEM
Filed Oct. 22, 1964   4 Sheets-Sheet 1

INVENTOR.
VERNON H. SIEGEL
BY *Le Blanc and Shur*

ATTORNEYS.

INVENTOR.
VERNON H. SIEGEL
BY
ATTORNEYS.

FIG. 5
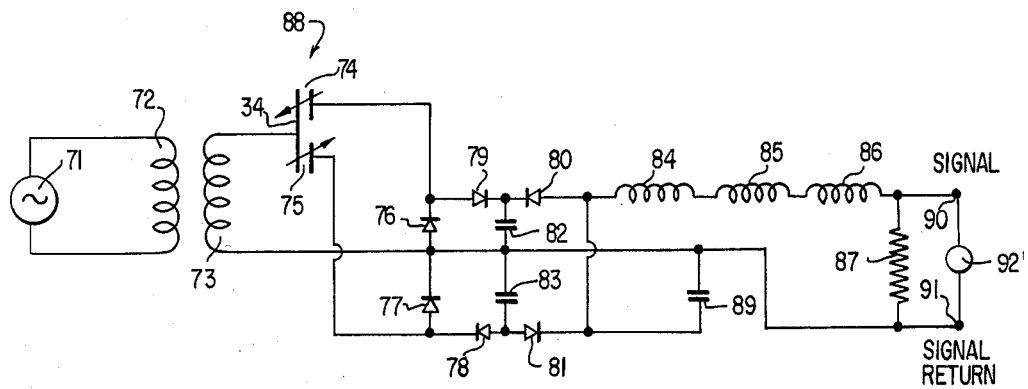
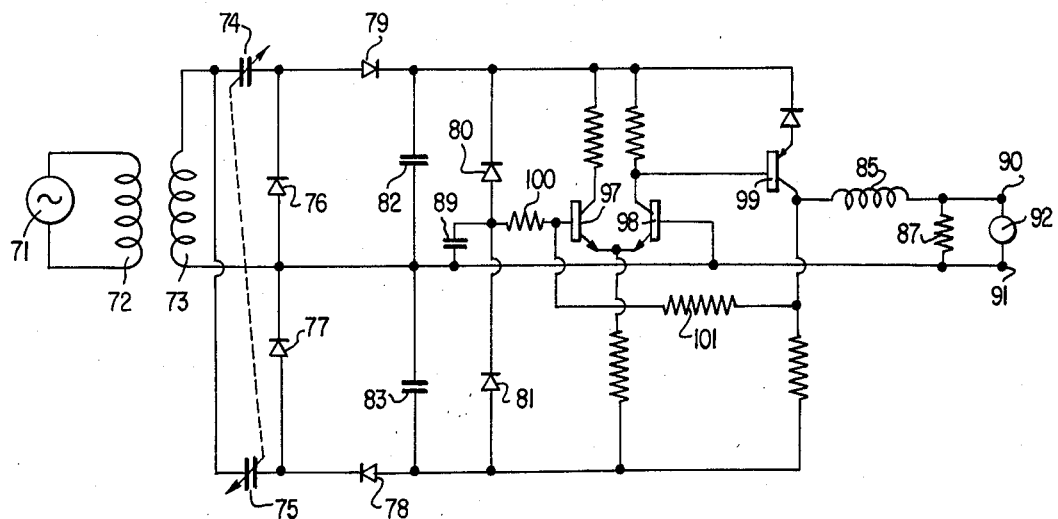
FIG. 6
INVENTOR.
VERNON H. SIEGEL
BY *Le Blanc and Shur*
ATTORNEYS.

though the text is difficult to read, 

United States Patent Office 3,478,605
Patented Nov. 18, 1969

---

3,478,605
ACCELEROMETER AND PICKOFF SYSTEM
Vernon H. Siegel, 233 Bernhardt Drive,
Snyder, N.Y. 14226
Continuation-in-part of application Ser. No. 139,666,
Sept. 21, 1961. This application Oct. 22, 1964, Ser.
No. 405,813
Int. Cl. G01p 15/08
U.S. Cl. 73—517     12 Claims

This application is a continuation-in-part of application Ser. No. 139,666 filed Sept. 21, 1961 and now abandoned.

This invention relates to accelerometers and more particularly to an improved linear force balance or servo-type accelerometer having a novel capacitive pickoff. This invention is also concerned with an accelerometer having an improved electrical circuitry for operating the servo loop for increasing the linearity of the system and operating the device independent of the electrical power supply.

Servo or force balance type accelerometers are well known and involve the provision of a seismic mass or inertial element movable in response to acceleration force exerted on the mass in a given direction. The movement of the mass is detected and an electrical indication of the forces exerted on the mass may be obtained.

The servo accelerometer to which the present invention is primarily directed is one in which the seismic mass includes an electric coil disposed in a magnetic field and arranged to move relative to this field. Movement of the mass as a result of the forces in a direction permitted by the suspension system acts to produce a control signal indicating the amount of movement and accordingly the amount of the force imposed on the mass. This signal is further utilized to generate a signal which is in turn fed back to the electrical coil comprising a part of the inertial mass and termed the forcer coil, thereby effecting a restoring force for returning the mass to a predetermined zero position relative to its associated magnetic field. The mounting of the inertial element or seismic mass is by suspending its opposed ends from a plurality of spaced transverse wires. This extension gives good radial constrainment while at the same time permitting adequate axial freedom of movement of the mass. The present invention is particularly concerned with an improved pickoff system for the accelerometer and improved electrical circuitry wherein elements of the accelerometer combine both seismic mass and electrical signal pickoff features.

It is therefore one object of the present invention to provide an improved accelerometer of simplified, compact and rugged construction.

Another object of the present invention is to provide an accelerometer having increased accuracy of operation.

Another object of the present invention is to provide an accelerometer having a common seismic element and electrical signal pickoff.

Another object of the invention is to provide a novel magnetic circuit for balance devices.

Another object of the present invention is to provide improved electrical circuitry for force balance or servo accelerometers.

Still another object of the present invention resides in the provision of a servo accelerometer employing a highly improved capacitive pickoff assembly, a novel seismic element, and unique circuitry for feeding back a signal to the forcer coil, which signal is indicative of acceleration forces exerted on the seismic mass.

Another object of the present invention is to provide a novel method of correcting for a difference between the mechanical null of the suspension as determined by the position of the various supporting elements and the electrical null as determined by the positioning of the capacity plates. The method of compensating requires no outside power supplies and has the advantage of reducing non-linearities in the output signal that are introduced by electrostatic forces inherent in the pickoff. This technique is not limited to the described instrument, and may be used in any similar device.

These and further objects and advantages of the invention will be more apparent upon reference to the following specification, claims and appended drawings wherein:

FIGURE 5 is a circuit diagram for the accelerometer of the present invention.

FIGURE 6 is a circuit diagram for a modified accelerometer constructed in accordance with this invention.

Figure 1:
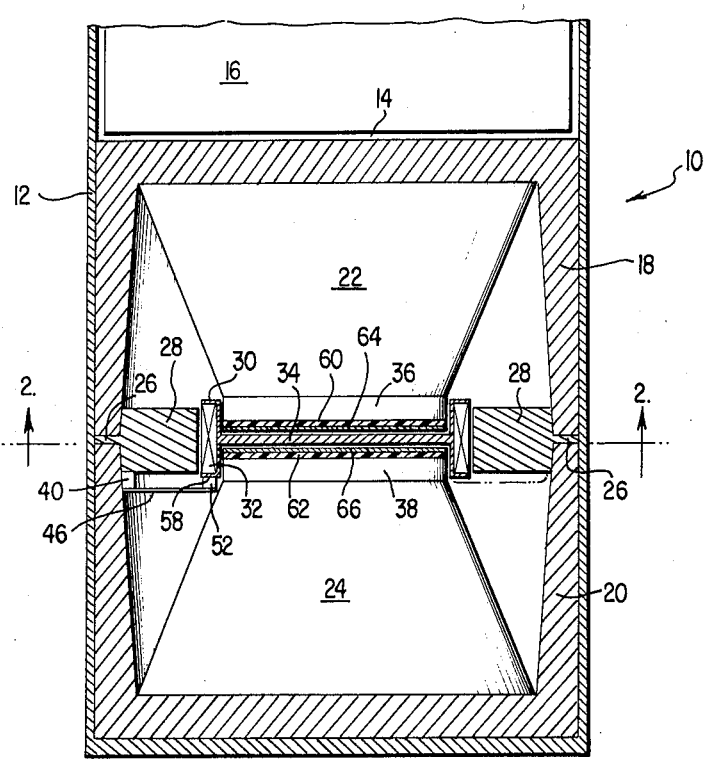
FIGURE 1 is an elevation with parts in cross section showing the novel accelerometer of the present invention.
Figure 2:
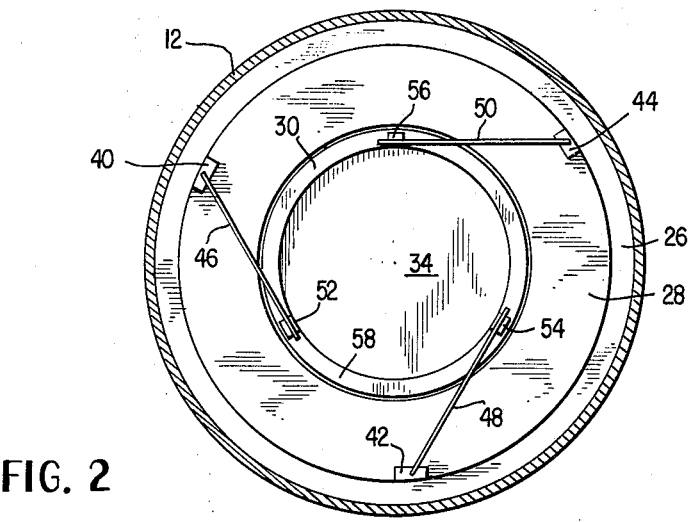
FIGURE 2 is a cross section taken along line 2—2 of FIGURE 1.
Figure 3:
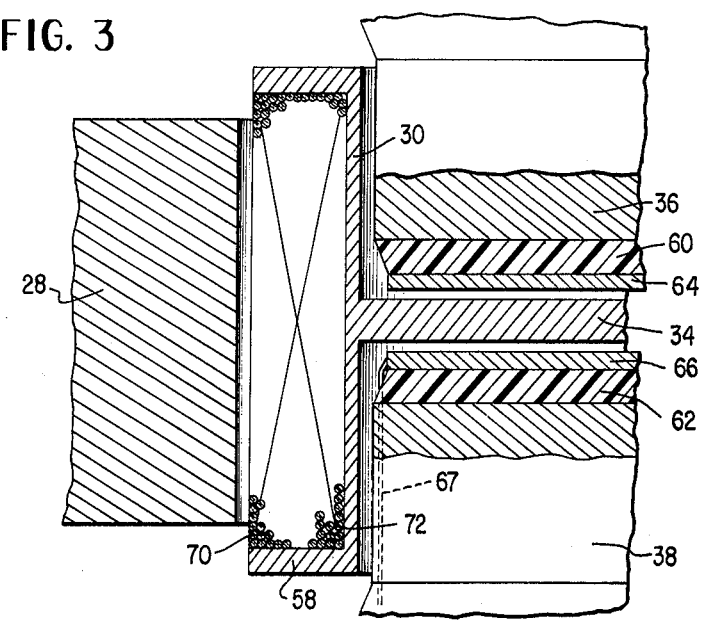
FIGURE 3 is an enlarged view of a portion of the seismic mass and capacitive pickoff portion of the accelerometer of FIGURES 1 and 2.

Referring to the drawings and especially to FIGURES 1 through 3, the novel accelerometer of the present invention generally indicated at 10 comprises a case 12 divided by a central partition 14 into an electronic circuit board compartment 16 and a mechanical compartment housing a pair of opposed soft iron cups 18 and 20. Received within the cups and secured thereto are the conically shaped permanent magnets 22 and 24.

Retained between the cups 18 and 20 is the outer annular flange 26 of a soft iron ring 28 which ring surrounds a spool 30 carrying one or more electrical windings 32. The web of the spool 34 forms a movable capacitor plate and passses between a pair of pole pieces or soft iron discs 36 and 38 secured to the respective permanent magnets 22 and 24.

As best seen in FIGURE 2, iron ring 28 carries three angularly spaced insulating blocks 40, 42 and 44 to which are secured the ends of three tangential conductive flexure arms or wires 46, 48 and 50. The opposite ends of these wires are secured to similar insulating blocks 52, 54 and 56 attached to the outer flange 58 of the spool 30.

Referring to FIGURES 1 and 3, each of the poles 36 and 38 is provided with a layer of insulation 60 and 62 which separates the respective pole piece from an additional metallic plate or conductive layer 64 and 66, respectively. This structure is shown to an enlarged scale in FIGURE 3. While the insulation may be formed of any suitable material, it is preferably a foam dielectric. The coil may be provided with a pair of windings 70 and 72, one of which is the forcer winding and the other of which may be used either for compensation or calibration. Electrical connection to the center capacitive plate 34 is by way of one of the support wires 46 to the conductive spool while electrical connection to the stationary steel plates 64 and 66 is in the manner illustrated in FIGURE 3 by way of a wire 67 passing through a suitable channel in the pole piece of the magnet.

In operation, to obtain a measurement of the motion of the spool 30 in response to outside acceleration forces the spool acts as a differential capacitive pickoff in conjunction with the steel plates 64 and 66. A high frequency voltage is applied to the spool through one of the suspension members 46, 48 or 50. Since the center of the spool area, that is, the plate 34, is in proximity to the steel plates 64 and 66, a charge is transferred to these plates, the magnitude of the charge being inversely proportional to the spacing between the movable plate 34 and these stationary plates. These plates are separated from the pole surfaces by the insulation such as foamed epoxy. However, plastic sheets or the like may be used and these insulating layers 60 and 62 not only provide electrical insulation but also act to decrease the capacity between the stationary plate 34 and the magnet poles. The signal from the stationary plates is amplitude compared in an electrical circuit described below in conjunction with FIGURE 5 which generates a current whose polarity and magnitude is related to the position of the spool plate 34 relative to the stationary plates. This current is coupled to the force winding of the spool to create a force opposing the external acceleration forces tending to displace the spool.

Figure 4:
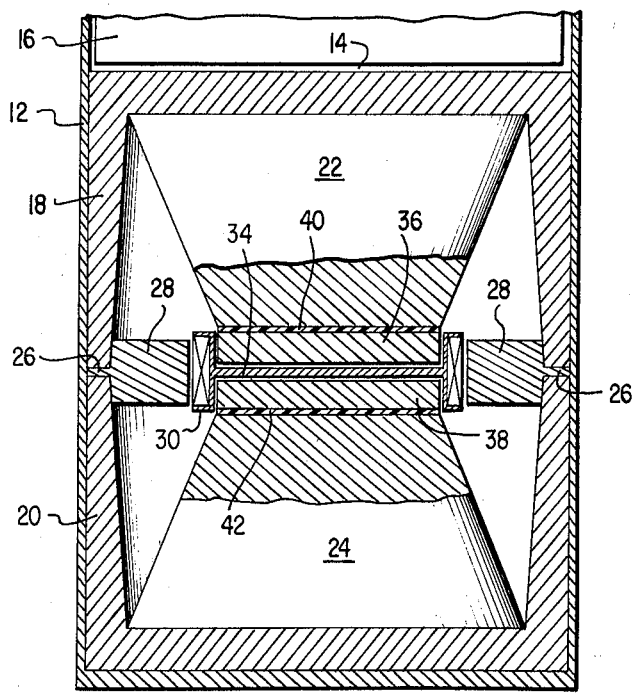
FIGURE 4 shows a modified pickoff construction.

FIGURE 4 shows a modified gauge construction with like parts bearing like reference numerals. This embodiment is in all respects similar to the previous gauge embodiment with the exception of the construction of the stationary plates. In this embodiment the poles 36 and 38 are spaced from the magnets 22 and 24 by insulating layers 40 and 42. In this instance, separate capacitive plates are not employed and the pole pieces 36 and 38 perform a dual role as magnetic path members for the flux between the magnets 22 and 24 and the ring 28 and also each of the poles 36 and 38 acts as a stationary capacitive plate receiving charge from the central plate 34 of the spool. Each pole is electrically isolated from its respective magnet by the insulation layer. It is apparent that the layer of insulation may be omitted if the magnets 22 and 24 are of the ceramic type having a high volume resistivity.

FIGURE 5 is a circuit diagram for the gauge of the present invention and suitable for use with the embodiment of FIGURES 1 through 3 or that of FIGURE 4. The gauge includes an AC generator 71 supplying energy to a transformer comprising a primary 72 and a secondary 73. The secondary of the transformer feeds a differential capacitor indicated by the reference numeral 88 and compirsing stationary plates 74 and 75 corresponding either to the plates 64 and 66 of FIGURE 1 or the poles 36 and 38 of FIGURE 4. The remaining portion of the differential capacitor 88 is formed by the movable plate 34. Also shown are rectifier diodes 76, 77, 78 and 79, Zener diodes 80 and 81, filter capacitors 82 and 83, three coils 84, 85 and 86 and load resistor 87. An output may be taken across load resistors 87 at output terminals 90 and 91 to meter 92.

The transformer is employed to isolate the signal return from the generator. If this isolation is not desired the transformer may be replaced by a conventional resistive capacitive coupling. The secondary 73 of the transformer feeds the spool web which acts as the moving portion of the differential capacitor 88 with fixed plates 74 and 75. On the positive half cycle of voltage from secondary 73 the side of the capacitor including plate 75 is charged through diode 77. On the negative half cycle the side of the capacitor including plate 74 is charged through diode 76 and simultaneously the charge on plate 75 is sent through diode 78 and Zener diode 81 to the RF choke 84.

On the next positive half-cycle charge is sent from the plate 74 through diode 79 and Zener diode 80 to RF choke 84. Capacitors 82 and 83 help filter the half wave pulses and provide a steadier flow of current. Capacitor 89 sums the two currents from the Zener diodes 80 and 81 which are of opposite polarity thereby producing a net voltage whose polarity is dependent upon the relative capacity values of the two sides of differential capacitor 88. Coil 85 is the forcer coil on the spool previously described. Since its winding is in close proximity to the spool which is excited with AC voltage, the capacity that exists between spool and winding might shunt the RF signal to either the output load resistor 87 or the capacitor 89. For this reason RF choke coils 84 and 86 are preferably included to produce a high impedance path to the RF voltage existing on forcer winding 85.

Zener diode 81 produces a voltage source which prevents current from diode 79 from flowing through diodes 78 and 77 and similarly Zener diode 80 prevents current from diode 78 from passing through diodes 79 and 76 until the voltage on capacitor 89 exceeds the value of the Zener diode 80. It can be seen that no resistive connection exists between the signal or signal return path and the primary 72 of the transformer thus offering no low frequency current flow to or from the generator. No components requiring DC input power are required in the circuitry connected to the secondary 73.

The circuit of FIGURE 5 is useful for most applications. However, there are occasions where large load resistors are desirable for high sensitivities or where great frequency responses and linearity are desired. In those instances, the gain offered by the circuit of FIGURE 5 may not be sufficient. To increase the gain of this circuit either the capacities of plates 74 and 75 may be increased which in some cases is mechcanically undesirable, or the frequency and amplitude of the generator 71 may be increased. This too often necessitates an increase in size, power consumption, and may add to overall non-linearity since the electrostatic forces generated by plates 74 and 75 also increase.

Referring to FIGURE 5, the addition of voltage gain between diodes 80 and 81 and choke 84 will produce the desired results but normally the addition of an amplifier at this point requires a power supply. If the same power supply is used that powers the generator 71, then the signal return is tied electrically to the power supply ground. A separate power supply may be employed but this increases the size, weight, cost and complexity.

FIGURE 6 shows a circuit which overcomes the above mentioned difficulties by including a voltage amplifier but providing a circuit which does not require a power supply and maintains an isolated signal output. In FIGURE 6, like parts again bear like reference numerals. In this arrangement, a differential amplifier composed of transistors 97 and 98 is connected to the signal available at capacitor 89. Current from diode 79 passes through Zener diode 80. Likewise current from diode 78 passes through Zener diode 81 producing a voltage drop.

When the capacitors 74 and 75 are equal these currents into capacitor 89 are equal and opposite resulting in no voltage across capacitor 89 but a plus voltage exists at the top of Zener diode 80 and a negative voltage appears at the bottom of Zener diode 81. This DC voltage is used to energize transistors 97, 98 and 99.

When capacitors 74 and 75 are not equal so that the currents into capacitor 89 are not equal then a voltage appears across capacitor 89. Since the voltage drop across a Zener diode is constant the voltages at the top of diode 80 and at the bottom of diode 81 change by a like amount. For instance, if the voltage at capacitor 89 changes from zero to plus one volt then the voltage at the top of diode 80 will increase one volt and the voltage at the bottom of diode 81 will decrease one volt, all measured with respect to the common signal return wire 91. A differential amplifier is employed since it is a type that variations in power supply potential have little influence on its voltage amplification properties. Transistor 99 is employed to further increase voltage gain and to return the signal DC level to a value near the input DC level. This then enables resistors 100 and 101 to be employed to establish the voltage gain of the amplifier.

It frequently occurs when the mechanical suspension is fabricated that at the position where mechanical forces of the suspension are balanced the capacity of capacitors 74 and 75 are not matched. That is, there may be a mismatch between the mechanical balance and the electrical balance positions of the spool. However, when the instrument is energized, the capacity of the plates will become nearly centered in spite of the opposing suspension forces. An output current will exist that is a measure of the opposing suspension forces. This produces an output voltage other than zero.

Figure 7:
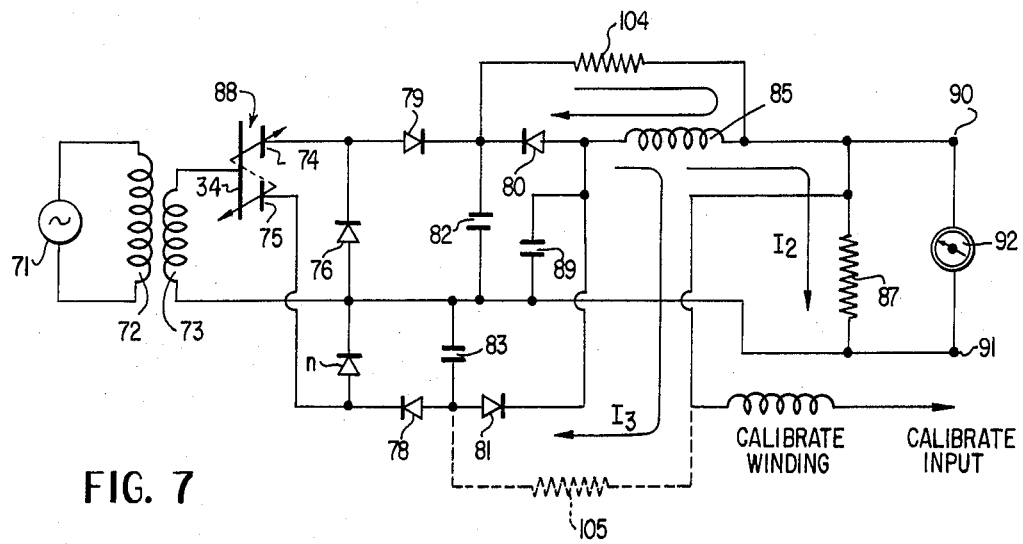
FIGURE 7 is a circuit diagram for a still further modified embodiment.

In most cases, it is desired to eliminate this voltage and it may be bucked out with an auxiliary supply or this force may be simply cancelled by passing a current through a second coil which produces an opposing force. However, a simpler method for eliminating this effect is illustrated in FIGURE 7. In that figure, a current $I_1$ is made to flow through the same forcer winding 85 as creates the force to oppose the suspension forces. This current is generated conveniently by a resistor 104 connected across Zener diode 80. If an opposite polarity correction is necessary, then the resistor 104 may be replaced by a resistor 105 indicated by dashed lines connected across Zener diode 81.

If forcer winding 85 has a zero or low resistance then the current $I_1$ is independent of the signal output level. However, since the winding 85 usually possesses considerable resistance, the signal current $I_2$ produces a voltage drop across this winding. This voltage drop reduces the net sum of the voltages in the loop in which $I_1$ flows and hence reduces the current $I_1$ as signal output increases. This effect may be used to improve linearity of the output signal.

Non-linearity occurs from a change in pickoff forces as displacement from nul increases. Ideally no displacement occurs when an outside force is applied. However, since loop gain is not infinite, a displacement of the spool will occur. As the moving capacity plate 34 approaches a fixed plate 74, or 75, a force due to electrostatic attraction increases inversely with the distance. The force generated by the current in winding 85 must not only overcome the applied force but also the force from the pickoff.

Figure 8:
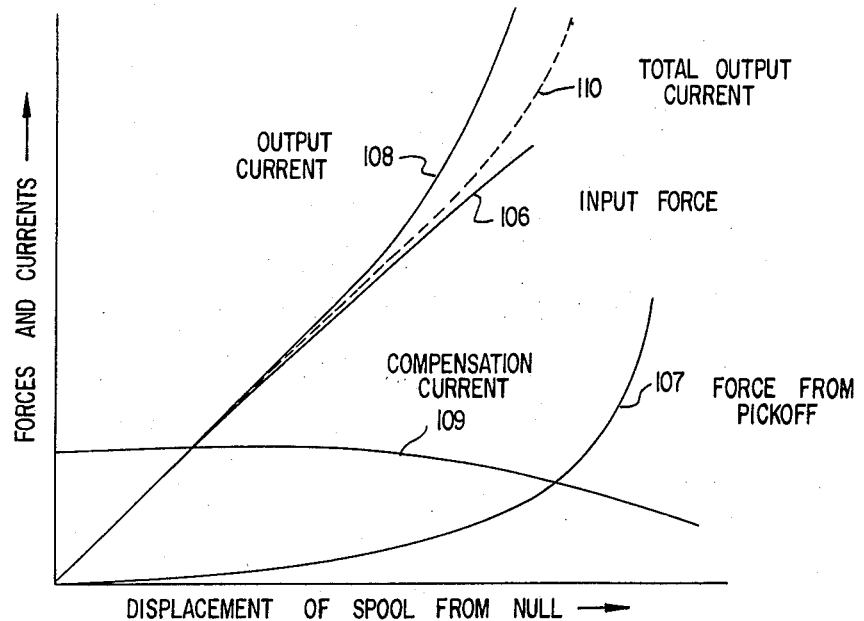
FIGURE 8 is a plot of forces and currents as a function of spool displacement for the gauge of FIGURE 7.

These forces and currents are displayed graphically in FIGURE 8. The input force is linear with displacement as shown by the curve 106 in FIGURE 8. However, the force from the pickoff increases non-linearly as illustrated by the curve 107. The output current that generates a force to overcome these two effects is shown in curve 108 and becomes non-linear as displacement increases. However, if a current $I_1$ flows in the compensation loop, this current decreases from its initial value as displacement increases, as is shown in curve 109. The net output current is shown by curve 110 which indicates an improvement in linearity. It may be noted that a mechanical null offset is not needed for the addition of resistors 104 and 105. Both may be used simultaneously and their difference may be zero if no compensation for null offset is required. If the values of Zener diodes 80 and 81 are chosen not equal, then the change in currents through resistors 104 and 105 can be made to vary any desired polarity or amount through wide variations in the signal current $I_2$.

It is apparent from the above that the present invention provides a novel arrangement whereby the seismic mass elements and magnetic circuit elements of an accelerometer are made to perform also as a capacitive displacement pickoff unit. The soft iron components completely surround the magnets to reduce the adverse effects of stray magnetic fields providing an improved and simplified circuit of increase sensitivity. The novel gauge also provides a system whereby active gain is used without connecting the signal return leads to a power supply. While the electrical systems are described in conjunction with an accelerometer, it is apparent that they may be used for any similar feedback system or may be used in a highly sensitive switch or the like. The gauge possesses increased accuracy, linearity and is of relatively simplified inexpensive construction.

Although the device has been described as double ended it is apparent that the novel electrical and magnetic circuitry of this invention as well as the novel capacitor plate construction are also applicable to a single ended device, i.e., one utilizing only a single permanent magnet and wherein the additional stationary capacitor plate is simply mounted on a suitable support such as the gauge cover.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. An accelerometer comprising a casing, a pair of soft iron cups in said casng, a solid permanent magnet in each of said cups, a pole piece and stationary capacitory plate mounted on each of said magnets and defining an air gap therebetween, a spool carrying a forcer coil surrounding said air gap and having a web passing through said air gap, said web forming a movable capacitor plate, a soft iron ring surrounding said spool and joining said cups to complete the magnetic circuit about said magnets, suspension wires connected to said spool and supporting said spool for movement only axially of said forcer coil, an AC generator coupled to said capacitor plates, and a differential detector consisting entirely of passive circuit elements for sensing movement of said web and feeding back of signal to said forcer coil to oppose said movement.

2. An accelerometer according to claim 1 wherein said generator is inductively coupled to said detector.

3. An accelerometer comprising a casing, a pair of soft iron cups in said casing, a solid permanent magnet in each of said cups, a pole piece and stationary capacitor plate mounted on each of said magnets and defining an air gap therebetween, a spool carrying a forcer coil surrounding said air gap and having a web passing through said air gap, said web forming a movable capacitor plate, a soft iron ring surrounding said spool and joining said cups to complete the magnetic circuit about said magnets, suspension wires connected to said spool and supporting said spool for movement only axially of said forcer coil, an AC generator inductively coupled to said web, a detector diode coupled to each of said stationary capacitor plates, constant voltage drop means coupled to the output of each of said detector diodes, summing means for summing the outputs from each of said detector diodes, and means for applying a signal from said summing means to said forcer coil to oppose said movement.

4. An accelerometer according to claim 3 wherein said constant voltage drop means are Zener diodes.

5. An accelerometer according to claim 4 including an output impedance and RF choke means isolating said forcer coil from said summing means and said output impedance.

6. An accelerometer according to claim 4 including DC transistor amplifier means having its power supply circuit coupled across said Zener diodes, its input circuit coupled to said summing means, and its output circuit coupled to said forcer coil.

7. A force balance system comprising a pair of spaced stationary capacitor plates, a third capacitor plate movable between said stationary plates in response to acceleration forces, a forcer coil for moving said third plate, an AC source, a transformer coupling said AC source to said movable plate, a detector diode coupled to each of said stationary plates, a pair of filter capacitors coupled across said detector diodes, a pair of series connected Zener diodes coupled across the outputs of said filter capacitors, said detector diodes and said Zener diodes being oppositely poled whereby a constant voltage drop exists across said pair of Zener diodes, a summing capacitor coupled to the junction of said Zener diodes, a DC transistor amplifier having its power supply circuit coupled to said constant voltage drop across said Zener diodes, the input circuit of said transistor amplifier being coupled to said Zener diode junction, and means coupling the output of said transistor amplifier to said forcer coil.

8. A force balance system according to claim 7 including an output impedance in series with said forcer coil, and meter means coupled to said output impedance.

9. A force balance system comprising a capacitor variable in response to external forces, a forcer coil for varying said capacitor in a direction to oppose said external forces, an AC generator for energizing said capacitor, a differential amplitude detector coupling said capacitor to said forcer coil, said detector including constant voltage means and at least one resistor coupled to said forcer coil for passing a compensating current from said detector through said forcer coil.

10. A system according to claim 9 wherein said constant voltage means comprises a pair of Zener diodes and said resistor is connected across one of said Zener diodes and said forcer coil.

11. A system according to claim 10 including a second resistor connected across the other of said Zener diodes and said forcer coil, a load resistor in series with said forcer coil, and a meter connected to said load resistor.

12. An accelerometer comprising a casing, a pair of soft iron cups supported in said casing, a circular cross sectioned solid permanent magnet in each of said cups, each of said magnets having one end adjacent the open mouth of its cup, a stationary capacitor plate carried by said one end of each of said magnets defining an air gap therebetween, a forcer coil surrounding said air gap and concentrically overlying said one end of each of said magnets, a conductive web carried with said forcer coil and passing through said air gap to form a movable capacitor plate, suspension wires coupled to said forcer coil for supporting said forcer coil and web for movement only axially of said forcer coil, said cups including a ring projecting radially inward to closely overlie said forcer coil whereby flux from said one end of each of sad magnets is conducted to its other end through said forcer coil, ring and its cup, means electrically coupled to said capacitor plates for sensing movement of said web, and means for feeding an electrical signal from said sensing means back to said forcer coil to oppose said movement, each of said permanent magnets being tapered to a reduced diameter toward said one end, said stationary capacitor plates being carried by pole pieces on said magnets, said stationary capacitor plates being formed by said pole pieces.

References Cited

UNITED STATES PATENTS

| | | |
|---|---|---|
| 2,714,702 | 8/1955 | Shockley. |
| 2,751,556 | 6/1956 | Chase. |
| 2,777,057 | 1/1957 | Pankove _____ 330—24 XR |
| 2,869,851 | 1/1959 | Sedgfield et al. _____ 73—517 |
| 2,947,176 | 8/1960 | Perry _____ 73—517 |
| 2,978,638 | 4/1961 | Wing et al. _____ 73—517 XR |
| 3,030,814 | 4/1962 | Ainsworth _____ 73—517 XR |
| 3,039,051 | 6/1962 | Locher _____ 324—61 |
| 3,111,036 | 11/1963 | Kistler _____ 73—517 |
| 3,151,486 | 10/1964 | Plummer _____ 73—517 |
| 3,221,563 | 12/1965 | Wing _____ 73—517 XR |

JAMES J. GILL, Primary Examiner